United States Patent
Lewis et al.

(10) Patent No.: US 11,880,067 B2
(45) Date of Patent: Jan. 23, 2024

(54) INTEGRATED ENVIRONMENTALLY INSENSITIVE MODULATOR FOR INTERFEROMETRIC GYROSCOPES

(71) Applicant: Honeywell International Inc., Charlotte, NC (US)

(72) Inventors: Jeffrey Earl Lewis, Phoenix, AZ (US); Matthew Wade Puckett, Phoenix, AZ (US); Neil A. Krueger, Saint Paul, MN (US); Chellappan Narayanan, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/712,917

(22) Filed: Apr. 4, 2022

(65) Prior Publication Data

US 2022/0229231 A1    Jul. 21, 2022

Related U.S. Application Data

(63) Continuation of application No. 16/869,425, filed on May 7, 2020, now Pat. No. 11,294,120.

(51) Int. Cl.
*G02B 6/125* (2006.01)
*G02B 6/126* (2006.01)
(Continued)

(52) U.S. Cl.
CPC ............ *G02B 6/125* (2013.01); *G01C 19/721* (2013.01); *G02B 6/12004* (2013.01);
(Continued)

(58) Field of Classification Search
CPC ........ G01C 19/721; G02B 6/125; G02B 6/12; G02B 6/14; G02B 6/305
(Continued)

(56) References Cited

U.S. PATENT DOCUMENTS

| 4,445,751 A | * | 5/1984 | Divens | G02F 1/225 |
| | | | | 216/11 |
| 5,148,503 A | * | 9/1992 | Skeie | G02F 1/225 |
| | | | | 385/16 |

(Continued)

FOREIGN PATENT DOCUMENTS

CN          106092080 A     11/2016
CN          105158849 B      4/2018
(Continued)

OTHER PUBLICATIONS

Ahmed et al., "High-performance racetrack resonator in silicon nitride—thin film lithium niobate hybrid platform", Optics Express 30741, Oct. 14, 2019, pp. 1-11, vol. 27, No. 21.

(Continued)

*Primary Examiner* — Kaveh C Kianni
(74) *Attorney, Agent, or Firm* — Fogg & Powers LLC

(57) ABSTRACT

In an example, an integrated optical circuit (IOC) includes a first substrate formed of a first material and a first waveguide formed of a second material and positioned on the first substrate. The first waveguide includes a plurality of branches and is configured to polarize light beams that propagate through the first waveguide. The IOC further includes a second substrate formed of a third material, the second substrate coupled to or positioned on the first substrate. The IOC further includes a plurality of straight waveguides formed in the second substrate, each of the plurality of straight waveguides optically coupled to a respective branch of the plurality of branches of the first waveguide. The IOC further includes a plurality of electrodes positioned proximate to the plurality of straight waveguides, the plurality of electrodes configured to modulate the phase of light beams that propagate through the plurality of straight waveguides.

20 Claims, 7 Drawing Sheets

(51) Int. Cl.
*G01C 19/72* (2006.01)
*G02B 6/12* (2006.01)

(52) U.S. Cl.
CPC ...... *G02B 6/126* (2013.01); *G02B 2006/1204* (2013.01); *G02B 2006/12147* (2013.01); *G02B 2006/12159* (2013.01); *G02B 2006/12176* (2013.01)

(58) Field of Classification Search
USPC .......................................................... 385/14
See application file for complete search history.

(56) References Cited

U.S. PATENT DOCUMENTS

| | | | | |
|---|---|---|---|---|
| 5,249,243 | A * | 9/1993 | Skeie | G02F 1/3136 359/279 |
| 5,355,422 | A * | 10/1994 | Sullivan | G02F 1/0356 385/2 |
| 5,377,283 | A * | 12/1994 | Blake | G01C 19/721 385/11 |
| 5,469,257 | A * | 11/1995 | Blake | G01C 19/721 356/464 |
| 5,530,777 | A * | 6/1996 | Enokihara | G02F 1/0356 385/2 |
| 5,854,862 | A * | 12/1998 | Skeie | G02F 1/225 385/40 |
| 6,167,169 | A * | 12/2000 | Brinkman | G02F 1/011 385/16 |
| 6,181,456 | B1 * | 1/2001 | McBrien | G02F 1/0123 385/2 |
| 6,522,793 | B1 * | 2/2003 | Szilagyi | G02F 1/225 385/2 |
| 7,526,161 | B2 * | 4/2009 | Ishii | G02B 6/29385 385/48 |
| 8,463,081 | B1 * | 6/2013 | Kissa | G02F 1/2255 359/279 |
| 8,798,406 | B1 * | 8/2014 | Hochberg | B82Y 20/00 385/2 |
| 8,953,913 | B2 | 2/2015 | Guattari et al. | |
| 9,081,136 | B2 | 7/2015 | Lefevre et al. | |
| 9,239,430 | B2 | 1/2016 | Lefevre et al. | |
| 9,291,837 | B1 * | 3/2016 | Yap | G02F 1/21 |
| 9,644,966 | B2 | 5/2017 | Lewis | |
| 10,290,619 | B2 | 5/2019 | Evans et al. | |
| 10,365,534 | B2 * | 7/2019 | Nakata | G02F 1/0126 |
| 10,545,288 | B2 | 1/2020 | Ma et al. | |
| 2002/0122615 | A1 * | 9/2002 | Painter | G02F 1/0118 385/24 |
| 2003/0223669 | A1 * | 12/2003 | Enokihara | G02F 1/0356 385/2 |
| 2008/0025662 | A1 * | 1/2008 | Kondo | G02F 1/0123 385/8 |
| 2009/0067771 | A1 * | 3/2009 | Chen | G02F 1/225 438/31 |
| 2009/0129719 | A1 * | 5/2009 | Rowinski | G02F 1/035 385/2 |
| 2009/0219545 | A1 * | 9/2009 | Feth | G01C 19/721 356/460 |
| 2009/0324163 | A1 * | 12/2009 | Dougherty | G02B 6/1228 385/14 |
| 2010/0027935 | A1 * | 2/2010 | Shiraishi | G02F 1/2255 385/2 |
| 2010/0135610 | A1 * | 6/2010 | Feth | G02B 6/1342 385/14 |
| 2011/0229070 | A1 * | 9/2011 | Doi | G02F 1/225 385/3 |
| 2013/0170781 | A1 * | 7/2013 | Kissa | G02F 1/0316 385/3 |
| 2014/0205229 | A1 * | 7/2014 | Thaniyavarn | G02F 1/225 385/3 |
| 2016/0076891 | A1 * | 3/2016 | Lewis | G02B 6/1342 385/11 |
| 2016/0109733 | A1 | 4/2016 | Porte et al. | |
| 2016/0178983 | A1 | 6/2016 | Alloatti et al. | |
| 2016/0357085 | A1 * | 12/2016 | Jewart | G02B 6/122 |
| 2019/0025666 | A1 * | 1/2019 | Byrnes | G03H 3/00 |

FOREIGN PATENT DOCUMENTS

| | | |
|---|---|---|
| CN | 106098745 B | 12/2018 |
| CN | 109579817 A | 4/2019 |
| CN | 109870768 A | 6/2019 |
| WO | 2019061900 A1 | 4/2019 |
| WO | 2020074834 A2 | 4/2020 |

OTHER PUBLICATIONS

European Patent Office, "Extended European Search Report from EP Application No. 21169262.9", from Foreign Counterpart to U.S. Appl. No. 16/869,425, dated Oct. 8, 2021, pp. 1 through 8, Published: EP.

Jin et al., "Mid-Infrared Electro-Optical Modulation Using Monolithically Integrated Titanium Dioxide on Lithium Niobate Optical Waveguides", Scientific Reports, Oct. 22, 2019, pp. 1-7, www.nature.com/scientificreports.

U.S. Patent and Trademark Office, "Notice of Allowance", U.S. Appl. No. 16/869,425, dated Nov. 24, 2021, pp. 1 through 12, Published: US.

U.S. Patent and Trademark Office, "Office Action", U.S. Appl. No. 16/869,425, dated Jun. 10, 2021, pp. 1 through 17, Published: US.

U.S. Patent and Trademark Office, "Restriction Requirement", U.S. Appl. No. 16/869,425, dated Apr. 2, 2021, pp. 1 through 6, Published: US.

* cited by examiner

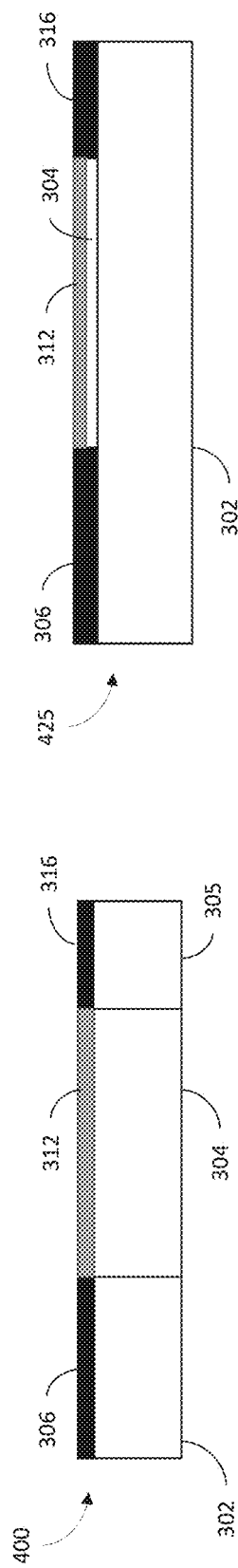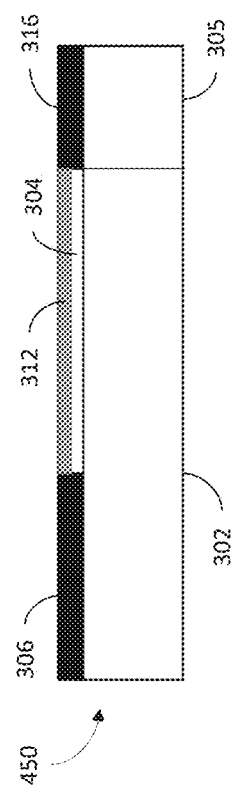
FIG. 4A
FIG. 4B
FIG. 4C

INTEGRATED ENVIRONMENTALLY INSENSITIVE MODULATOR FOR INTERFEROMETRIC GYROSCOPES

CROSS REFERENCE TO RELATED APPLICATIONS

This application is a continuation of U.S. application Ser. No. 16/869,425, filed May 7, 2020, and titled "INTEGRATED ENVIRONMENTALLY INSENSITIVE MODULATOR FOR INTERFEROMETRIC GYROSCOPES," which is hereby incorporated herein by reference.

BACKGROUND

Typically, interferometric fiber optic gyroscopes include an integrated optical circuit that performs three functions. In particular, the integrated optical circuit operates as a 50/50 optical coupler, a phase modulator, and a polarizer. The integrated optical circuit receives a single beam of light, polarizes the light (for example, using annealed proton exchanged portions of a waveguide), splits the polarized light (for example, using a Y-junction), and passes the light through phase modulators. To prevent environmental instability, titanium indiffused waveguides can be used for the phase modulators and stitched together with the annealed proton exchanged portions of the waveguide.

Integrated optical circuits for interferometric gyroscope are generally monolithic lithium niobate devices because lithium niobate is particularly well suited for performing phase modulation. In order to reduce size, weight, and cost of interferometric gyroscopes, it is desirable to increase the integration of functions into a single device (for example, the integrated optical circuit). However, lithium niobate does not lend itself to large scale integration of other functions due to the physical properties of the material.

SUMMARY

In an example, an integrated optical circuit includes a first substrate formed of a first material and a first waveguide formed of a second material and positioned on the first substrate. The first waveguide includes a plurality of branches and is configured to polarize light beams that propagate through the first waveguide. The integrated optical circuit further includes a second substrate formed of a third material, the second substrate coupled to or positioned on the first substrate. The integrated optical circuit further includes a plurality of straight waveguides formed in the second substrate, each of the plurality of straight waveguides optically coupled to a respective branch of the plurality of branches of the first waveguide. The integrated optical circuit further includes a plurality of electrodes positioned proximate to the plurality of straight waveguides, the plurality of electrodes configured to modulate the phase of light beams that propagate through the plurality of straight waveguides.

DRAWINGS

Understanding that the drawings depict only some embodiments and are not therefore to be considered limiting in scope, the exemplary embodiments will be described with additional specificity and detail using the accompanying drawings, in which:

FIGS. 4A-4C are cross-sectional, side views of example integrated optical circuits;

Figure 1:
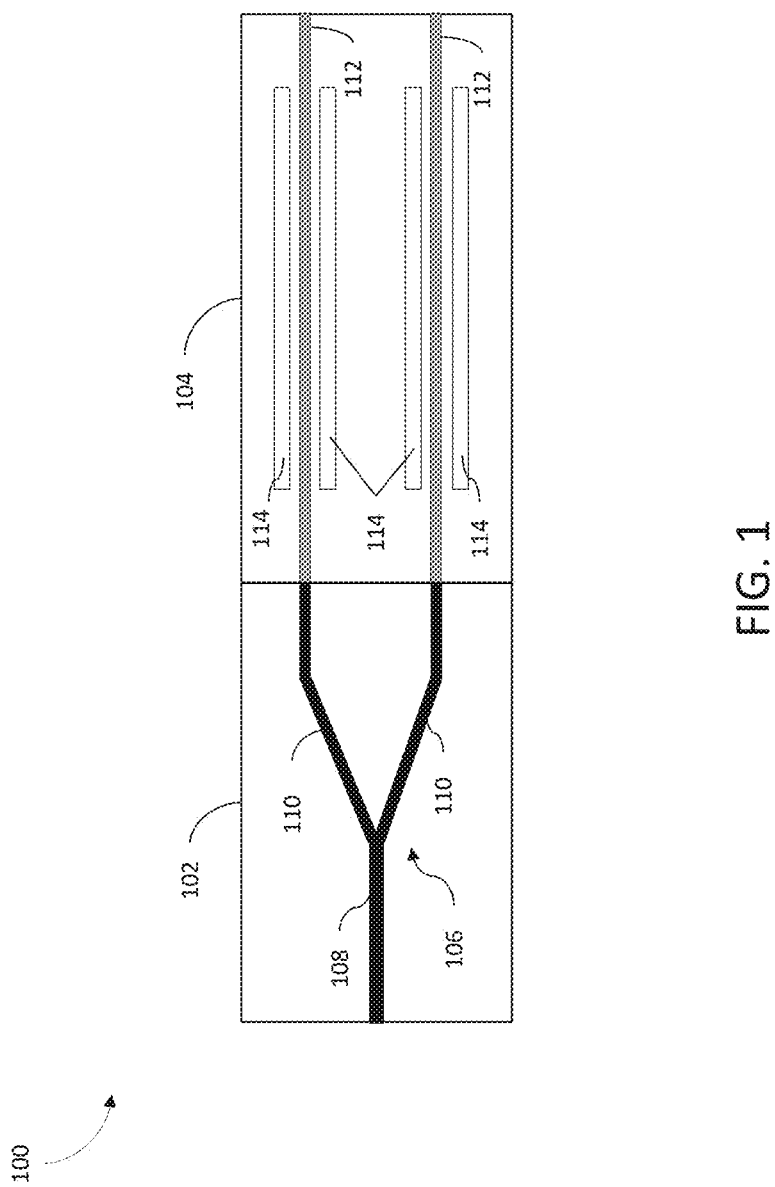
FIG. 1 is a top view of an example integrated optical circuit.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Systems and methods for an integrated optical circuit for interferometric gyroscopes are provided herein. The integrated optical circuit utilizes a first substrate with a first waveguide for polarization and splitting functions and utilizes a second substrate and second waveguides for phase modulation. The first waveguide and the second waveguides are optically coupled and the second substrate is either deposited on the first substrate or otherwise physically coupled to the first substrate. In some examples, the first waveguide can be formed from a material that is transparent at the operating wavelength (for example, silicon nitride, titanium dioxide, or silicon oxynitride) and the second waveguides can be formed from a material that has a non-zero second-order nonlinear coefficient (for example, lithium niobate or lithium tantalate). By using different substrates rather than a single monolithic substrate, smaller size and/or better integration of functionality can be achieved than with previous designs while maintaining a high level of performance.

FIG. 1 is a top view of an example integrated optical circuit 100. In the example shown in FIG. 1, the integrated optical circuit 100 includes a first substrate 102 and a second substrate 104 coupled to or positioned on the first substrate 102. A first waveguide 106 is formed on the first substrate 102 and second waveguides 112 are formed in the second substrate 104 and positioned proximate to electrodes 114.

The first substrate 102 is formed of a first material. In some examples, the first material is silicon. In other examples, other similar materials can be used for the first substrate 102. In the example shown in FIG. 1, a first waveguide 106 is positioned on the first substrate 102. The first waveguide 106 is formed from a second material that is different than the first material. In some examples, the first waveguide 106 is formed of silicon nitride. In some examples, the first waveguide 106 is formed of another material, such as, for example, titanium dioxide, silicon oxynitride, or another material that is transparent at an operating wavelength of the integrated optical circuit (for example, 1550 nm). The second material used for the first waveguide 106 has a higher refractive index than the surrounding material, which includes the first substrate 102 and any material used for cladding.

In the example shown in FIG. 1, the first waveguide 106 includes an input section 108 and multiple branches 110 that form a Y-junction. The first waveguide 106 functions as a splitter for light that is input into the first waveguide 106 at the input section 108. In some examples, the first waveguide 106 is configured to polarize light beams that propagate through the first waveguide 106. In some examples, the dimensions (for example, width or height) of the first waveguide 106 can be selected to achieve the desired polarization of light propagating through the first waveguide 106. In some examples, the dimensions (for example, width and height) of the first waveguide 106 are varied over the length of the input section 108 and/or the branches 110 of the first waveguide 106.

In the example shown in FIG. 1, the second substrate 104 is coupled to or positioned on the first substrate 102. The second substrate 104 is formed of a third material that is different from the first material and the second material, and the third material has particular non-linear electro-optic properties that are suitable for phase modulation for an interferometric gyroscope. In some examples, the third material is a lithium niobate. In other examples, the second substrate 104 is formed of lithium tantalate substrate or another material that has a non-zero second-order nonlinear coefficient.

In the example shown in FIG. 1, two straight waveguides 112 are formed in the second substrate 104 and each of the straight waveguides 112 is optically coupled to a respective branch 110 of the first waveguide 106. In some examples, there is an intermediate stage configured to facilitate the optical signal transition between the branches 110 of the first waveguide 106 and the straight waveguides 112. In some examples, the straight waveguides 112 are coupled to the branches 110 of the first waveguide 106 via an adiabatic coupling, which can minimize optical loss. In some examples, the straight waveguides 112 are titanium indiffused waveguides formed in the second substrate 104. Since titanium is not mobile inside the second substrate (for example, lithium niobate or lithium tantalate), titanium indiffused waveguides are more environmentally stable than other types of waveguides (for example, proton exchanged waveguides). In other examples, a different type of waveguide can be formed or patterned in the second substrate 104 (for example, by in-diffusion and etching).

In the example shown in FIG. 1, electrodes 114 are positioned proximate to the straight waveguides 112 in the second substrate 104. The features of the second substrate 104 are configured to modulate the phase of light propagating through the straight waveguides 112. In some examples, the electrodes 114 are configured to modulate the phase of light beams that propagate through the straight waveguides 112 of the second substrate 104.

As discussed below with respect to FIGS. 6-7, the integrated optical circuit 100 can be manufactured in different ways, which result is some different physical characteristics for the integrated optical circuit 100. However, the operation of the integrated optical circuit 100 is similar regardless of the manufacturing used to make the integrated optical circuit 100.

Figure 2B:
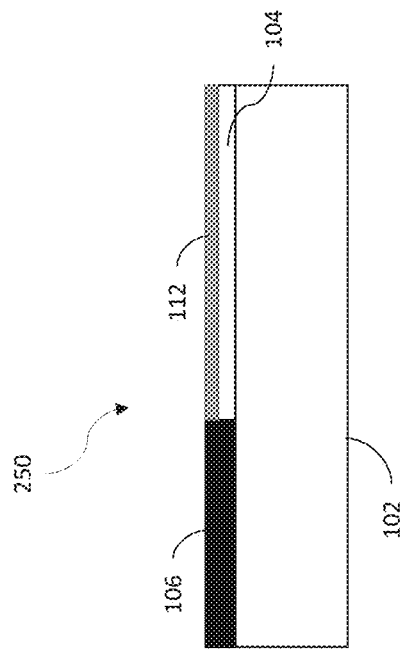
FIGS. 2A-2B are cross-sectional, side views of example integrated optical circuits.
Figure 2A:
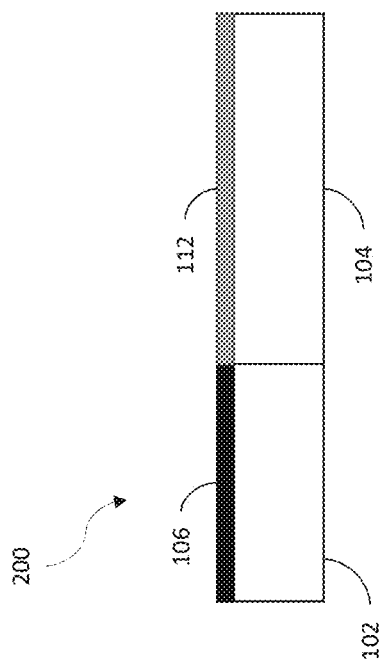

FIG. 2A is a cross-sectional, side view of an example of the integrated optical circuit 100 shown in FIG. 1 where the second substrate 104 is coupled to the first substrate 102. In such examples, the first substrate 102 and the second substrate 104 are formed separately and physically coupled together. In some examples, the first substrate 102 and the second substrate 104 are bonded or coupled together using an adhesive. The example integrated optical circuit 200 shown in FIG. 2A can be manufactured using the method described with respect to FIG. 6.

FIG. 2B is a cross-sectional, side view of an example of the integrated optical circuit 100 shown in FIG. 1 where the second substrate 104 is positioned on the first substrate 102. In such examples, the first substrate 102 is a common substrate for the first waveguide 106 and the second substrate 104 with the straight waveguides 112. In some examples, the second substrate 104 is deposited or grown on the first substrate 102 and the straight waveguides 112 are formed in the second substrate 104 (for example, by in-diffusion and etching). The example integrated optical circuit 250 shown in FIG. 2B can be manufactured using the method described with respect to FIG. 7, which can be easier to manufacture compared to the example shown in FIG. 2A.

Figure 3:
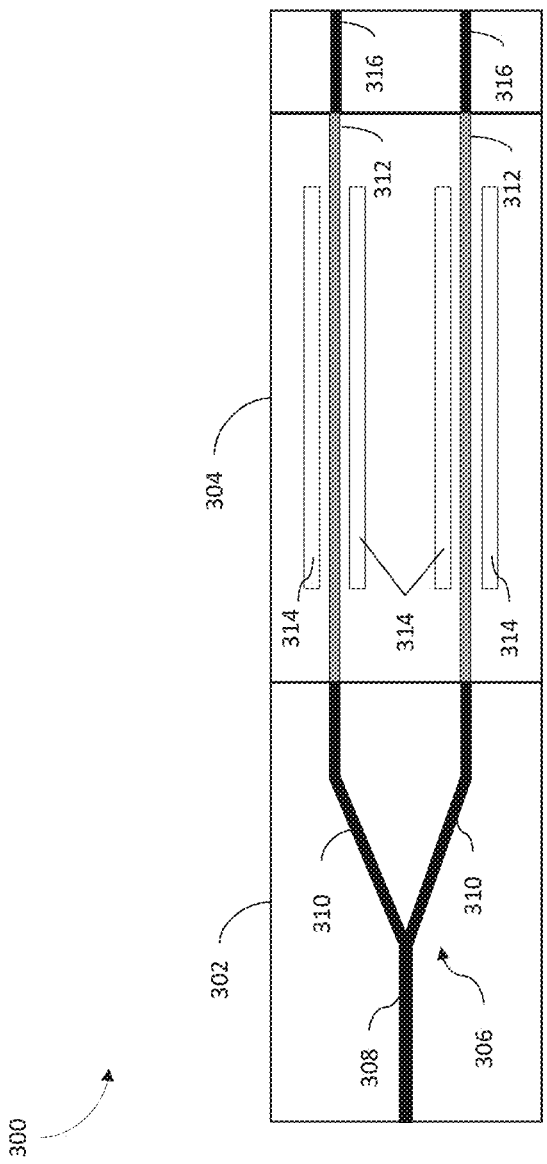
FIG. 3 is a top view of an example integrated optical circuit.

FIG. 3 is a top view of an example integrated optical circuit 300. In the example shown in FIG. 3, the integrated optical circuit 300 includes a first substrate 302 and a second substrate 304 coupled to or positioned on the first substrate 302. A first waveguide 306 is formed on the first substrate 302 and straight waveguides 312 are formed in the second substrate 304 and positioned proximate to electrodes 314. In the example shown in FIG. 3, the integrated optical circuit 300 further includes second straight waveguides 316, which are formed on the first substrate 302 or a third substrate 305.

The first substrate 302 is formed of a first material. In some examples, the first material is silicon. In other examples, other similar materials can be used for the first substrate 302. In the example shown in FIG. 3, a first waveguide 306 is positioned on the first substrate 302. The first waveguide 306 is formed from a second material that is different than the first material. In some examples, the first waveguide 306 is formed of silicon nitride. In some examples, the first waveguide 306 is formed of another material, such as, for example, titanium dioxide, silicon oxynitride, or another material that is transparent at an operating wavelength of the integrated optical circuit (for example, 1550 nm). The second material used for the first waveguide 306 has a higher refractive index than the surrounding material, which includes the first substrate 302 and any material used for cladding.

In the example shown in FIG. 3, the first waveguide 306 includes an input section 308 and multiple branches 310 that form a Y-junction. The first waveguide 306 functions as a splitter for light that is input into the first waveguide 306 at the input section 308. In some examples, the first waveguide 306 is configured to polarize light beams that propagate through the first waveguide 306. In some examples, the dimensions (for example, width or height) of the first waveguide 306 can be selected to achieve the desired polarization of light propagating through the first waveguide 306. In some examples, the dimensions (for example, width and height) of the first waveguide 306 are varied over the length of the input section 308 and/or the branches 310 of the first waveguide 306.

In the example shown in FIG. 3, the second substrate 304 is coupled to or positioned on the first substrate 302. The second substrate 304 is formed of a third material that is different from the first material and the second material, and the third material has particular non-linear electro-optic properties that are suitable for phase modulation for an interferometric gyroscope. In some examples, the third material is a lithium niobate. In other examples, the second substrate 304 is formed from lithium tantalate substrate or another material that has a non-zero second-order nonlinear coefficient.

In the example shown in FIG. 3, two straight waveguides 312 are formed in the second substrate 304 and each of the straight waveguides 312 is optically coupled to a respective branch 310 of the first waveguide 306. In some examples, the straight waveguides 312 are coupled to the branches 310 of the first waveguide 306 via an adiabatic coupling, which can minimize optical loss. In some examples, there is an intermediate stage configured to facilitate the optical signal transition between the branches 310 of the first waveguide 306 and the straight waveguides 312. In some examples, the straight waveguides 312 are titanium indiffused waveguides formed in the second substrate 304. Since titanium is not mobile inside the second substrate (for example, lithium niobate or lithium tantalate), titanium indiffused waveguides are more environmentally stable than other types of waveguides (for example, proton exchanged waveguides). In other examples, a different type of waveguide can be formed or patterned in the second substrate 304 (for example, by in-diffusion and etching).

In the example shown in FIG. 3, electrodes 314 are positioned proximate to the straight waveguides 312 in the second substrate 304. The features of the second substrate 304 are configured to modulate the phase of light propagating through the straight waveguides 312. In some examples, the electrodes 314 are configured to modulate the phase of light beams that propagate through the straight waveguides 312 of the second substrate 304.

In the example shown in FIG. 3, the integrated optical circuit 300 includes additional straight waveguides 316 that are positioned on either the first substrate 302 or a third substrate 305 that is separate from the first substrate 302 and the second substrate 304. Each of the additional straight waveguides 316 is optically coupled to a respective straight waveguide 312 formed in the second substrate 304. In some examples, there is an intermediate stage configured to facilitate the optical signal transition between the straight waveguides 312 of the second substrate 304 and the additional straight waveguides 316. The additional straight waveguides 316 are used to fine tune the polarization of the light after phase modulation. In some examples, the dimensions (for example, width or height) of the additional straight waveguides 316 can be selected to achieve the desired polarization of light propagating through the additional straight waveguides 316. In some examples, the dimensions (for example, width and height) of the additional straight waveguides 316 are varied over the length of the additional straight waveguides 316.

As discussed below with respect to FIGS. 6-7, the integrated optical circuit 300 can be manufactured in different ways, which result is some different physical characteristics for the integrated optical circuit 300. However, the operation of the integrated optical circuit 300 is similar regardless of the manufacturing used to make the integrated optical circuit 300.

FIG. 4A is a cross-section view of an example of an integrated optical circuit 300 shown in FIG. 3 where the first substrate 302 is coupled to the second substrate 304 and the second substrate 304 is coupled to a third substrate 305. In such examples, the first substrate 302, the second substrate 304, and the third substrate 305 are formed separately and physically coupled together. In some examples, the first substrate 302, the second substrate 304, and the third substrate 305 are bonded or coupled together using an adhesive. The example integrated optical circuit 400 shown in FIG. 4A can be manufactured using the method described with respect to FIG. 6.

In the example shown in FIG. 4A, the additional straight waveguides 316 are positioned on the third substrate 305 that is separate from the first substrate 302 and the second substrate 304. In such examples, the third substrate 305 can be formed from the same material as the first substrate 302 (first material) or a fourth material suitable as a substrate that is different than the other materials discussed above. In some such examples, the additional straight waveguides 316 are formed from the same material as the first waveguide 306 (second material) or from a different material that has a higher refractive index than surrounding materials including the third substrate 305 and any cladding material. In some examples, the additional straight waveguides 316 can be formed from silicon nitride, titanium dioxide, silicon oxynitride, or another material that is transparent at an operating wavelength of the integrated optical circuit (for example, 1550 nm).

FIG. 4B is a cross-section view of an alternative example of the integrated optical circuit 300 shown in FIG. 3 where the second substrate 304 is positioned on the first substrate 302 and the first substrate 302 is a common substrate for the first waveguide 306, the second substrate 304 with the straight waveguides 312, and the additional straight waveguides 316. In some examples, the second substrate 304 is deposited or grown on the first substrate 302 and the first set of straight waveguides 312 are formed in the second substrate 304 (for example, by in-diffusion and etching). The example integrated optical circuit 425 shown in FIG. 4B can be manufactured using the method described with respect to FIG. 7, which can be easier to manufacture compared to the example shown in FIG. 4A.

In the example shown in FIG. 4B, the additional straight waveguides 316 are positioned on the first substrate 302. In such examples, the additional straight waveguides 316 can be formed from the same material as the first waveguide 306 (the second material) or from a different material that has a higher refractive index than surrounding materials including the first substrate 302 and any cladding material. In some examples, the additional straight waveguides 316 can be formed from silicon nitride, titanium dioxide, silicon oxynitride, or another material that is transparent at an operating wavelength of the integrated optical circuit (for example, 1550 nm).

FIG. 4C is a cross-section view of an alternative example of the integrated optical circuit 300 shown in FIG. 3 where the second substrate 304 is positioned on the first substrate 302, but the first substrate 302 is not a common substrate for the additional straight waveguides 316. In some examples, the second substrate 304 is deposited or grown on the first substrate 302 and the first set of straight waveguides 312 are formed in the second substrate 304 (for example, by in-diffusion and etching). In such examples, the first substrate 302 and the third substrate 305 are formed separately and physically coupled together. In some examples, the first substrate 302 and the third substrate 305 are bonded or coupled together using an adhesive. The example integrated optical circuit 450 shown in FIG. 4B can be manufactured using a hybrid of the methods described with respect to FIGS. 6-7.

In the example shown in FIG. 4C, the additional straight waveguides 316 are positioned on the third substrate 305 that is separate from the first substrate 302 and the second substrate 304. In such examples, the third substrate 305 can be formed from the same material as the first substrate 302

(first material) or a fourth material suitable as a substrate that is different than the other materials discussed above. In some such examples, the additional straight waveguides 316 are formed from the same material as the first waveguide 306 (second material) or from a different material that has a higher refractive index than surrounding materials including the third substrate 305 and any cladding material. In some examples, the additional straight waveguides 316 can be formed from silicon nitride, titanium dioxide, silicon oxynitride, or another material that is transparent at an operating wavelength of the integrated optical circuit (for example, 1550 nm).

Typically, the front-end of an interferometric fiber optic gyroscope includes a light source that is separate from the integrated optical circuit and an optical fiber is used to couple the light into the waveguides of the integrated optical circuit. Further, additional components that are beneficial for monitoring and controlling operation of the integrated optical circuit and interferometric gyroscope are also separate from the integrated optical circuit. By having these additional components separate from the integrated optical circuit, the previous designs can have significant disadvantages from a size, weight, and cost perspective.

By using multiple substrates and different materials for the waveguides as discussed above, the integrated optical circuits 100, 300 can include a greater amount of integration on the integrated optical circuits 100, 300 (for example, more components on the integrated optical circuit) and reduce the size, weight, and cost of the integrated optical circuits 100, 300 and/or an interferometric gyroscope that includes the integrated optical circuits 100, 300. For example, by using a different material to form the first waveguide 106, 306 (for example, silicon nitride) than the material used for phase modulation (for example, lithium niobate or lithium tantalate), the first waveguide 106, 306 can have significantly better mode confinement than previous designs and the size of the first waveguide 106, 306 can be reduced without degraded performance. In some examples, the length of the input section 108, 308 of the first waveguide 106, 306 could be shortened and the angle of the Y-junction can be made steeper.

In some examples, the integrated optical circuits 100, 300 include an integrated light source (not shown) mounted to the first substrate 102, 302, and the integrated light source is optically coupled to the input section 108, 308 of the first waveguide 106, 306. In some examples, the integrated light source is a semiconductor or solid-state laser light source configured to provide the light signal for the integrated optical circuit 100, 300. Significant reductions in size, weight, and cost can be achieved over previous designs by using an integrated optical circuit with an integrated light source.

In some examples, the integrated optical circuits 100, 300 include one or more integrated tap couplers (not shown) configured to couple light from the first waveguide 106, 306. In some examples, the one or more integrated tap couplers are configured to couple a portion of light from the first waveguide 106, 306 and provide the coupled light to another component on the integrated optical circuit 100, 300. In some examples, the one or more integrated tap couplers are configured to provide the coupled light to one or more integrated photodetectors on the integrated optical circuit 100, 300, which can be mounted or disposed on the first substrate 102, 302. In some examples, the one or more integrated photodetectors are photodiodes. In some examples, one or more integrated tap couplers are configured to provide light to a rate detector.

Figure 5:
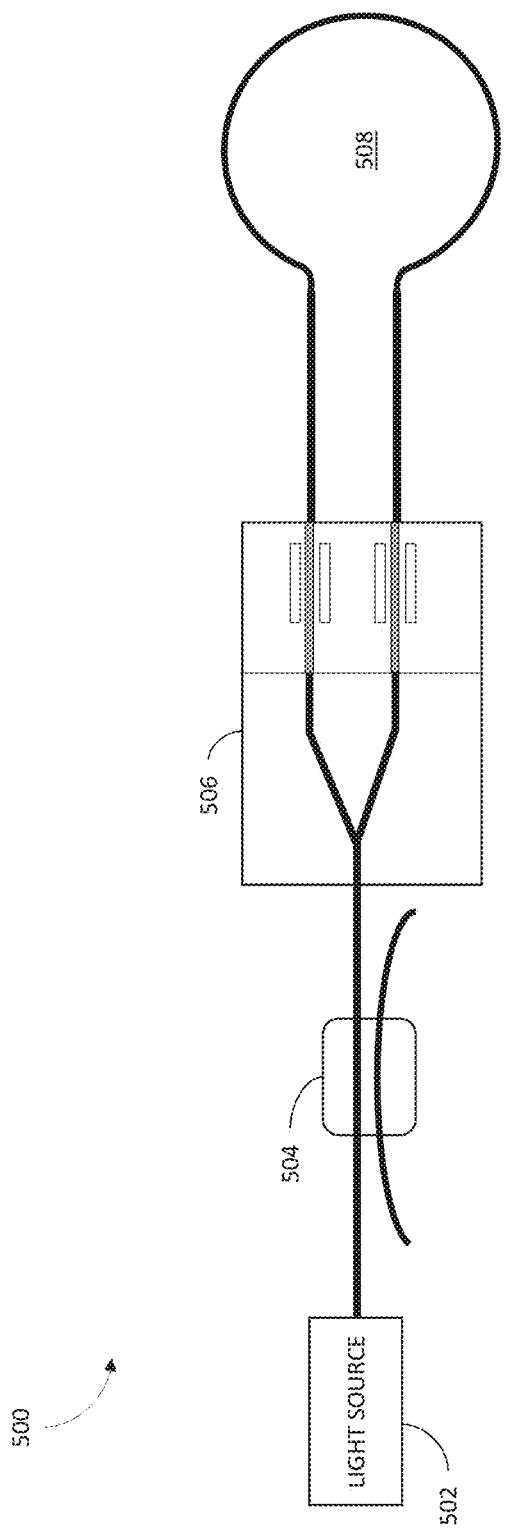
FIG. 5 is a diagram of an example interferometric gyroscope.

FIG. 5 is a block diagram of an example interferometric gyroscope 500. In the example shown in FIG. 5, the interferometric gyroscope 500 includes a light source 502, a coupler 504, an integrated optical circuit 506, and a sensing coil 508. While the integrated optical circuit 506 shown in FIG. 5 corresponds to the integrated optical circuit 100 shown in FIG. 1, it should be understood that the integrated optical circuit 506 can comprise any of the integrated optical circuits 100, 300 discussed above with respect to FIGS. 1-4C.

The light source 502 is configured to generate a light signal that is to be coupled into the sensing coil 508. In some examples, the light source 502 is a broadband light source configured to generate a light signal that is comprised of many waves with different wavelengths and polarization states. In the example shown in FIG. 5, the light source 502 is separate from the integrated optical circuit 506. In other examples, the light source 502 is integrated on the integrated optical circuit 506 as discussed above.

In the example shown in FIG. 5, the coupler 504 is included between the light source 502 and the integrated optical circuit 506. In examples where the light source 502 is separate from the integrated optical circuit 506, the light source 502 is optically coupled to the integrated optical circuit 506 using one or more optical fibers and the coupler 504. For example, the optical fiber optically coupled to the light source 502 can extend through the coupler 504 and be optically coupled to a waveguide of the integrated optical circuit 506 (for example, the first waveguide 106, 306 as discussed above with respect to FIGS. 1-4C). In some examples, the coupler 504 includes both the optical fiber to optically couple the light source to the integrated optical circuit and an output optical fiber configured to carry a returned signal from the phase modulators to a rate detector that reads the returning signal from the sensing coil 508.

In examples where the light source 502 is integrated on the integrated optical circuit 506, the light source 502 itself is optically coupled to a waveguide of the integrated optical circuit 506 (for example, the first waveguide 106, 306 as discussed above with respect to FIGS. 1-4C). In such examples, the coupler 504 is also integrated on the integrated optical circuit 506. In some examples, the integrated coupler 504 can be implemented using a tap coupler as discussed above.

In the example shown in FIG. 5, the sensing coil 508 is optically coupled to the integrated optical circuit 506. In some examples, the sensing coil 508 is optically coupled to the straight waveguides (for example, waveguides 112, 312, or 316 as discussed above with respect to FIGS. 1-4C) of the integrated optical circuit 506 using pigtail fibers. The sensing coil 508 is configured to receive light signals from the integrated optical circuit 506 and to output light signals to the integrated optical circuit 506.

Figure 6:
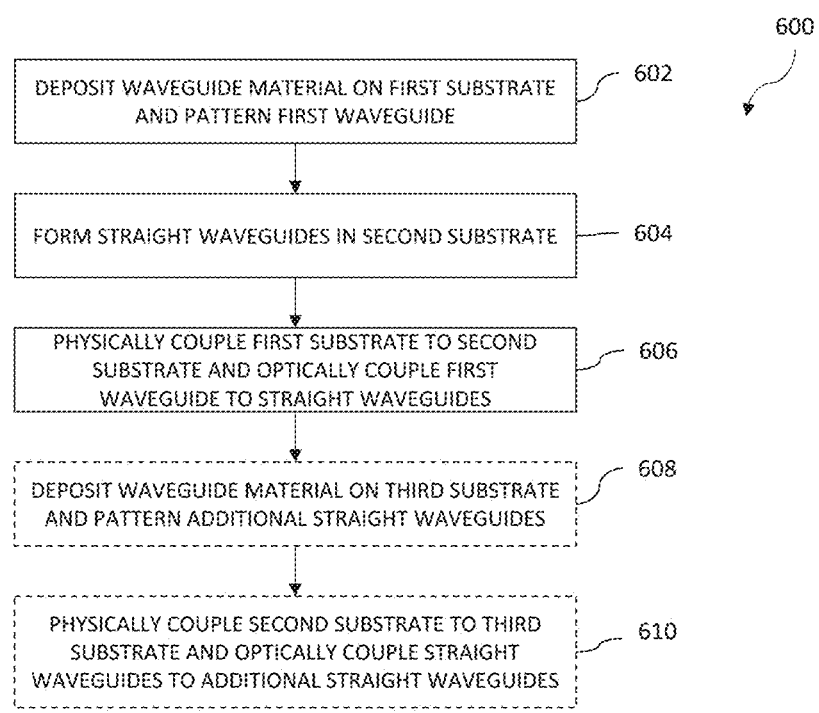
FIG. 6 is a flow diagram of an example method of manufacturing an integrated optical circuit.

FIG. 6 is a flow diagram for a method 600 of manufacturing an integrated optical circuit. The functions, structures, and other description of liked-named elements for such examples described herein may apply to like-named elements described with reference to the method 600 and vice versa.

The method 600 includes depositing a waveguide material on a first substrate and patterning a first waveguide (block 602). The waveguide material can be deposited and patterned using known thin film techniques. In some examples, the first waveguide has an input section and multiple branches similar to the first waveguides discussed above with respect to FIGS. 1-4C. In some examples, the first substrate is formed from a first material (for example, silicon) and the waveguide material is different than the first material. In some examples, the waveguide material is silicon nitride. In some examples, the waveguide material is formed of another material, such as, for example, titanium dioxide, silicon oxynitride, or other material that is transparent at an operating wavelength of the integrated optical circuit (for example, 1550 nm). The waveguide material has a higher refractive index than the surrounding material, which includes the first substrate and any material used for cladding.

The method 600 further includes forming straight waveguides in a second substrate (block 604). In some examples, the second substrate is formed of a third material that is different from the first material and the second material, and the third material has particular non-linear electro-optic properties that are suitable for phase modulation for an interferometric gyroscope. In some examples, the third material is a lithium niobate. In other examples, the third material is lithium tantalate or another material that has a non-zero second-order nonlinear coefficient. In some examples, the straight waveguides are formed by diffusing titanium waveguide material into the second substrate. In some examples, the straight waveguides are formed by in-diffusion and etching (for example, deep ion etching).

The method 600 further includes physically coupling the first substrate and the second substrate and optically coupling the first waveguide and the straight waveguides (block 606). In some examples, the first substrate and the second substrate are bonded or coupled together using an adhesive. In some examples, the branches of the first waveguide are optically coupled to the straight waveguides formed in the second substrate via an adiabatic coupling. In some examples, there is an intermediate stage configured to facilitate the optical signal transition between the branches of the first waveguide and the straight waveguides.

The method 600 optionally includes depositing a waveguide material on a third substrate and patterning additional straight waveguides on the third substrate (block 608). The waveguide material can be deposited and patterned using known thin film techniques. In some examples, the third substrate is formed from the same material as the first substrate (first material) or a fourth material suitable as a substrate that is different than the other materials discussed above. In some such examples, the additional straight waveguides are formed from the same material as the first waveguide (second material) or from a different material that has a higher refractive index than surrounding materials including the third substrate and any cladding material. In some examples, the additional straight waveguides can be formed from silicon nitride, titanium dioxide, silicon oxynitride, or another material that is transparent at an operating wavelength of the integrated optical circuit (for example, 1550 nm).

The method 600 optionally includes physically coupling the second substrate and the third substrate and optically coupling the straight waveguides of the second substrate and the additional straight waveguides of the third substrate (block 610). In some examples, the second substrate and the third substrate are bonded or coupled together via an adhesive. In some examples, the straight waveguides of the second substrate and the additional straight waveguides of the third substrate are optically coupled via an adiabatic coupling. In some examples, there is an intermediate stage configured to facilitate the optical signal transition between the straight waveguides formed in the second substrate and the additional straight waveguides on the third substrate.

Figure 7:
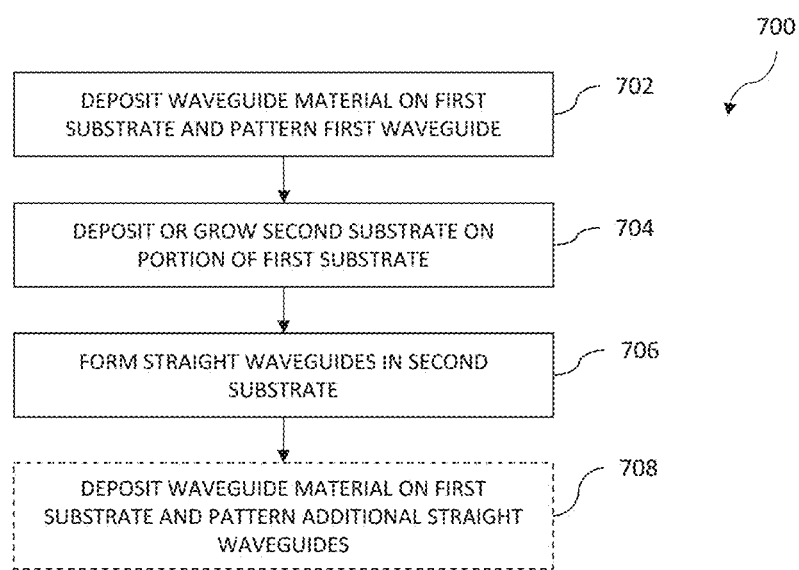
FIG. 7 is a flow diagram of an example method of manufacturing an integrated optical circuit.

FIG. 7 is a flow diagram of a method 700 of manufacturing an integrated optical circuit. The functions, structures, and other description of liked-named elements for such examples described herein may apply to like-named elements described with reference to the method 700 and vice versa.

The method 700 includes depositing waveguide material on a first substrate and patterning a first waveguide (block 702). The waveguide material can be deposited and patterned using known thin film techniques. In some examples, the first waveguide has an input section and multiple branches similar to the first waveguides discussed above with respect to FIGS. 1-4C. In some examples, the first substrate is formed from a first material (for example, silicon) and the waveguide material is different than the first material. In some examples, the waveguide material is silicon nitride. In some examples, the waveguide material is formed of another material, such as, for example, titanium dioxide, silicon oxynitride, or another material that is transparent at an operating wavelength of the integrated optical circuit (for example, 1550 nm). The waveguide material has a higher refractive index than the surrounding material, which includes the first substrate and any material used for cladding.

The method 700 further includes depositing or growing a second substrate on a portion of the first substrate (block 704). In some examples, the second substrate is grown on the first substrate using molecular beam epitaxy (MBE) or other thin film techniques.

The method 700 further includes forming straight waveguides in the second substrate (block 706). In some examples, the second substrate is formed of a third material that is different from the first material and the second material, and the third material has particular non-linear electro-optic properties that are suitable for phase modulation for an interferometric gyroscope. In some examples, the third material is a lithium niobate. In other examples, the third material is lithium tantalate or another material that has a non-zero second-order nonlinear coefficient. In some examples, the straight waveguides are formed by diffusing titanium waveguide material into the second substrate. In some examples, the straight waveguides are formed by in-diffusion and etching (for example, deep ion etching).

The method 700 optionally includes depositing waveguide material on the first substrate and patterning additional straight waveguides on the first substrate (block 708). The waveguide material can be deposited and patterned using known thin film techniques. In some examples, the additional straight waveguides are similar to the additional straight waveguides discussed above with respect to FIGS. 3-4C. In some examples, the additional straight waveguides are formed from the same material as the first waveguide (second material) or from a different material that has a higher refractive index than the first substrate and any cladding material. In some examples, the additional straight waveguides can be formed from silicon nitride, titanium dioxide, silicon oxynitride, or other material that is transparent at an operating wavelength of the integrated optical circuit (for example, 1550 nm).

In various aspects, system elements, method steps, or examples described throughout this disclosure may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions, used for synchronization and fault management in a distributed antenna system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes an integrated optical circuit, comprising: a first substrate formed of a first material; a first waveguide formed of a second material and positioned on the first substrate, wherein the first waveguide includes a plurality of branches and is configured to polarize light beams that propagate through the first waveguide; a second substrate formed of a third material, wherein the second substrate is coupled to or positioned on the first substrate; a plurality of first straight waveguides formed in the second substrate, wherein each of the plurality of first straight waveguides is optically coupled to a respective branch of the plurality of branches of the first waveguide; and a plurality of electrodes positioned proximate to the plurality of first straight waveguides, wherein the plurality of electrodes is configured to modulate the phase of light beams that propagate through the plurality of first straight waveguides.

Example 2 includes the integrated optical circuit of Example 1, wherein the second material is transparent at an operating wavelength of the integrated optical circuit.

Example 3 includes the integrated optical circuit of Example 2, wherein the second material is silicon nitride, titanium dioxide, or silicon oxynitride.

Example 4 includes the integrated optical circuit of any of Examples 1-3, wherein the third material has a non-zero second-order nonlinear coefficient.

Example 5 includes the integrated optical circuit of any of Examples 1-4, wherein the third material is lithium niobate or lithium tantalate.

Example 6 includes the integrated optical circuit of any of Examples 1-5, further comprising: a plurality of second straight waveguides positioned on the first substrate, wherein each second straight waveguide of the plurality of second straight waveguides is optically coupled to a respective first straight waveguide of the plurality of first straight waveguides, wherein the plurality of first straight waveguides is positioned between the first waveguide and the plurality of second straight waveguides; wherein each respective second straight waveguide of the plurality of second straight waveguides is configured to polarize light beams that propagate through the respective second straight waveguide.

Example 7 includes the integrated optical circuit of any of Examples 1-5, further comprising: a plurality of second straight waveguides positioned on a third substrate, wherein each second straight waveguide of the plurality of second straight waveguides is optically coupled to a respective first straight waveguide of the plurality of first straight waveguides, wherein the plurality of first straight waveguides is positioned between the first waveguide and the plurality of second straight waveguides; wherein each respective second straight waveguide of the plurality of second straight waveguides is configured to polarize light beams that propagate through the respective second straight waveguide.

Example 8 includes the integrated optical circuit of any of Examples 1-7, further comprising: a light source mounted on the first substrate, wherein the light source is optically coupled to the first waveguide and configured to generate a light signal.

Example 9 includes the integrated optical circuit of any of Examples 1-8, wherein the second substrate is deposited or grown on the first substrate, wherein the plurality of first straight waveguides is formed by in-diffusion and etching.

Example 10 includes the integrated optical circuit of any of Examples 1-9, wherein the second substrate is bonded or coupled to the first substrate via an adhesive.

Example 11 includes an interferometric gyroscope, comprising: an integrated optical circuit, comprising: a first substrate formed of a first material; a first waveguide formed of a second material and positioned on the first substrate, wherein the first waveguide includes a plurality of branches and is configured to polarize light beams that propagate through the first waveguide; a second substrate formed of a third material, wherein the second substrate is coupled to or positioned on the first substrate; a plurality of first straight waveguides formed in the second substrate, wherein each of the plurality of first straight waveguides is optically coupled to a respective branch of the plurality of branches of the first waveguide; and a plurality of electrodes positioned proximate to the plurality of first straight waveguides, wherein the plurality of electrodes is configured to modulate the phase of light beams that propagate through the plurality of first straight waveguides; a light source configured to generate a light signal, wherein the light source is optically communicatively coupled to the first waveguide of the integrated optical circuit; and a sensing coil configured to receive signals from the integrated optical circuit and output signals to the integrated optical circuit.

Example 12 includes the interferometric gyroscope of Example 11, wherein the second material is silicon nitride, titanium dioxide, or silicon oxynitride.

Example 13 includes the interferometric gyroscope of any of Examples 11-12, wherein the third material is lithium niobate or lithium tantalate.

Example 14 includes the interferometric gyroscope of any of Examples 11-13, wherein the integrated optical circuit further comprises: a plurality of second straight waveguides positioned on the first substrate, wherein each second straight waveguide of the plurality of second straight waveguides is optically coupled to a respective first straight waveguide of the plurality of first straight waveguides, wherein the plurality of first straight waveguides is positioned between the first waveguide and the plurality of second straight waveguides; wherein each respective second straight waveguide of the plurality of second straight waveguides is configured to polarize light beams that propagate through the respective second straight waveguide.

Example 15 includes the interferometric gyroscope of any of Examples 11-13, further comprising: a plurality of second straight waveguides positioned on a third substrate, wherein each second straight waveguide of the plurality of second straight waveguides is optically coupled to a respective first straight waveguide of the plurality of first straight waveguides, wherein the plurality of first straight waveguides is positioned between the first waveguide and the plurality of second straight waveguides; wherein each respective second straight waveguide of the plurality of second straight waveguides is configured to polarize light beams that propagate through the respective second straight waveguide.

Example 16 includes the interferometric gyroscope of any of Examples 11-15, wherein the light source is mounted on the first substrate.

Example 17 includes the interferometric gyroscope of any of Examples 11-16, wherein the second substrate is deposited or grown on the first substrate, wherein the plurality of first straight waveguides is formed by in-diffusion and etching.

Example 18 includes the interferometric gyroscope of any of Examples 11-17, wherein the second substrate is bonded or coupled to the first substrate via an adhesive.

Example 19 includes an integrated optical circuit, comprising: a first substrate formed of a first material; a first waveguide formed of a second material and positioned on the first substrate, wherein the first waveguide includes a plurality of branches and is configured to polarize light beams that propagate through the first waveguide; a second substrate formed of a third material, wherein the second substrate is coupled to or positioned on the first substrate; a plurality of first straight waveguides formed in the second substrate, wherein each of the plurality of first straight waveguides is optically coupled to a respective branch of the plurality of branches of the first waveguide; a plurality of electrodes positioned proximate to the plurality of first straight waveguides, wherein the plurality of electrodes is configured to modulate the phase of light beams that propagate through the plurality of first straight waveguides; and a plurality of second straight waveguides formed of the second material and positioned on the first substrate or a third substrate, wherein each second straight waveguide of the plurality of second straight waveguides is optically coupled to a respective first straight waveguide of the plurality of first straight waveguides, wherein the plurality of first straight waveguides is positioned between the first waveguide and the plurality of second straight waveguides, wherein each respective second straight waveguide of the plurality of second straight waveguides is configured to polarize light beams that propagate through the respective second straight waveguide.

Example 20 includes the integrated optical circuit of Example 19, wherein the second material is silicon nitride, titanium dioxide, or silicon oxynitride; and wherein the third material is lithium niobate or lithium tantalate.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An integrated optical circuit, comprising:
a first substrate formed of a first material;
a first waveguide formed of a second material and positioned on the first substrate, wherein the first waveguide is configured to polarize light beams that propagate through the first waveguide, wherein the first waveguide is configured to split a light beam input into the first waveguide into multiple light beams;
a second substrate formed of a third material, wherein the second substrate is coupled to or positioned on the first substrate; and
a plurality of phase modulators positioned on or in the second substrate, wherein each respective phase modulator of the plurality of phase modulators is optically coupled to a respective branch of the first waveguide, wherein each respective phase modulator of the plurality of phase modulators is configured to modulate a phase of light beams that propagate through the respective phase modulator.

2. The integrated optical circuit of claim 1, wherein the first waveguide includes an input section and multiple branches that form a Y-junction.

3. The integrated optical circuit of claim 1, wherein the second material has a higher refractive index than the first material, wherein the third material has a non-zero second-order nonlinear coefficient.

4. The integrated optical circuit of claim 1, wherein the second material is silicon nitride, titanium dioxide, or silicon oxynitride, wherein the third material is lithium niobate or lithium tantalate.

5. The integrated optical circuit of claim 1, further comprising:
a plurality of straight waveguides positioned on the first substrate, wherein each respective straight waveguide of the plurality of straight waveguides is optically coupled to a respective phase modulator of the plurality of phase modulators positioned between the first waveguide and the respective straight waveguide of the plurality of straight waveguides;
wherein each respective straight waveguide of the plurality of straight waveguides is configured to polarize light beams that propagate through the respective straight waveguide of the plurality of straight waveguides.

6. The integrated optical circuit of claim 1, further comprising:
a plurality of straight waveguides positioned on a third substrate, wherein each respective straight waveguide of the plurality of straight waveguides is optically coupled to a respective phase modulator of the plurality of phase modulators positioned between the first waveguide and the respective straight waveguide of the plurality of straight waveguides;
wherein each respective straight waveguide of the plurality of straight waveguides is configured to polarize light beams that propagate through the respective straight waveguide of the plurality of straight waveguides.

7. The integrated optical circuit of claim 1, further comprising:
a light source mounted on the first substrate, wherein the light source is optically coupled to the first waveguide and configured to generate a light signal.

8. The integrated optical circuit of claim 1, wherein the second substrate is positioned on the first substrate, wherein the plurality of phase modulators includes a plurality of indiffused waveguides.

9. The integrated optical circuit of claim 1, wherein the second substrate is bonded or coupled to the first substrate via an adhesive.

10. An interferometric gyroscope, comprising:
an integrated optical circuit, comprising:
a first substrate formed of a first material;
a first waveguide formed of a second material and positioned on the first substrate, wherein the first waveguide is configured to polarize light beams that propagate through the first waveguide, wherein the first waveguide is configured to split a light beam input into the first waveguide into multiple light beams;
a second substrate formed of a third material, wherein the second substrate is coupled to or positioned on the first substrate; and
a plurality of phase modulators positioned on or in the second substrate, wherein each respective phase modulator of the plurality of phase modulators is optically coupled to a respective branch of the first waveguide, wherein each respective phase modulator of the plurality of phase modulators is configured to modulate a phase of light beams that propagate through the respective phase modulator;
a light source configured to generate a light signal, wherein the light source is optically communicatively coupled to the first waveguide of the integrated optical circuit; and
a sensing coil configured to receive signals from the integrated optical circuit and output signals to the integrated optical circuit.

11. The interferometric gyroscope of claim 10, wherein the first waveguide includes an input section and multiple branches that form a Y-junction.

12. The interferometric gyroscope of claim 10, wherein the second material has a higher refractive index than the first material, wherein the third material has a non-zero second-order nonlinear coefficient.

13. The interferometric gyroscope of claim 10,
wherein the second material is silicon nitride, titanium dioxide, or silicon oxynitride;
wherein the third material is lithium niobate or lithium tantalate.

14. The interferometric gyroscope of claim 10, wherein the integrated optical circuit further comprises:
a plurality of straight waveguides positioned on the first substrate, wherein each respective straight waveguide of the plurality of straight waveguides is optically coupled to a respective phase modulator of the plurality of phase modulators positioned between the first waveguide and the respective straight waveguide of the plurality of straight waveguides;
wherein each respective straight waveguide of the plurality of straight waveguides is configured to polarize light beams that propagate through the respective straight waveguide of the plurality of straight waveguides.

15. The interferometric gyroscope of claim 10, further comprising:
a plurality of straight waveguides positioned on a third substrate, wherein each respective straight waveguide of the plurality of straight waveguides is optically coupled to a respective phase modulator of the plurality of phase modulators positioned between the first waveguide and the respective straight waveguide of the plurality of straight waveguides;
wherein each respective straight waveguide of the plurality of straight waveguides is configured to polarize light beams that propagate through the respective straight waveguide of the plurality of straight waveguides.

16. The interferometric gyroscope of claim 10, wherein the light source is mounted on the first substrate.

17. The interferometric gyroscope of claim 10, wherein the second substrate is positioned on the first substrate, wherein the plurality of phase modulators include a plurality of indiffused waveguides.

18. The interferometric gyroscope of claim 10, wherein the second substrate is bonded or coupled to the first substrate via an adhesive.

19. An integrated optical circuit, comprising:
a first substrate formed of a first material;
a first waveguide formed of a second material and positioned on the first substrate, wherein the first waveguide is configured to split and polarize light beams that propagate through the first waveguide;
a second substrate formed of a third material, wherein the second substrate is coupled to or positioned on the first substrate;
a plurality of phase modulators positioned on or in the second substrate, wherein each respective phase modulator of the plurality of phase modulators is optically coupled to a respective branch of the first waveguide, wherein each respective phase modulator of the plurality of phase modulators is configured to modulate a phase of light beams that propagate through the respective phase modulator; and
a plurality of straight waveguides formed of the second material and positioned on the first substrate or a third substrate, wherein each respective straight waveguide of the plurality of straight waveguides is optically coupled to a respective phase modulator of the plurality of phase modulators positioned between the first waveguide and the respective straight waveguide of the plurality of straight waveguides, wherein each respective straight waveguide of the plurality of straight waveguides is configured to polarize light beams that propagate through the respective straight waveguide of the plurality of straight waveguides.

20. The integrated optical circuit of claim 19, wherein the first waveguide includes an input section and multiple branches that form a Y-junction.

\* \* \* \* \*